March 8, 1927.  1,620,277
C. T. MYERS
MAGAZINE LUBRICATING MEANS
Filed Aug. 8, 1923    3 Sheets-Sheet 1

INVENTOR
CORNELIUS T. MYERS
BY
A. D. T. Libby
ATTORNEY

March 8, 1927.
C. T. MYERS
1,620,277
MAGAZINE LUBRICATING MEANS
Filed Aug. 8, 1923   3 Sheets-Sheet 2
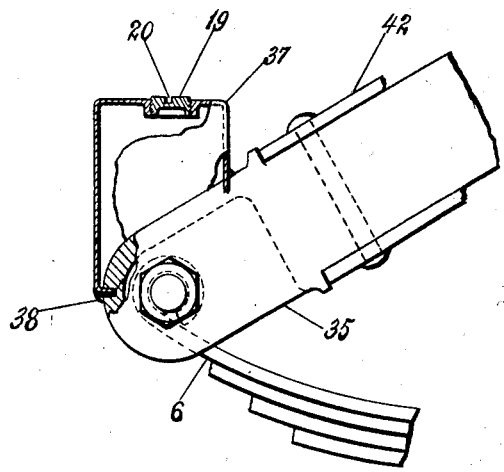
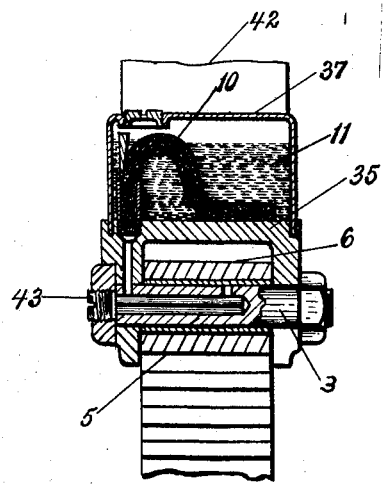
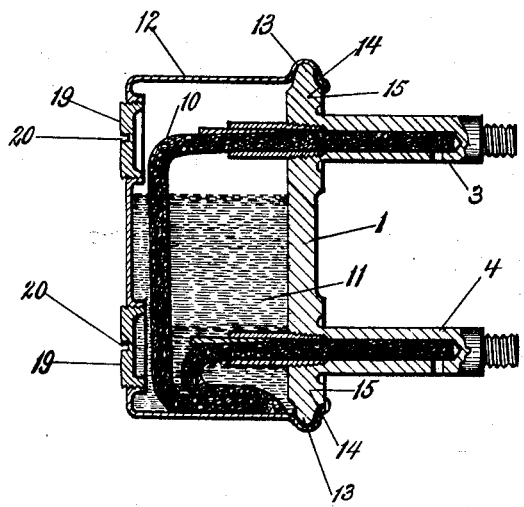
INVENTOR
CORNELIUS T. MYERS
BY
A. D. T. Libby
ATTORNEY March 8, 1927. 1,620,277
C. T. MYERS
MAGAZINE LUBRICATING MEANS
Filed Aug. 8, 1923    3 Sheets-Sheet 3
Fig. 10
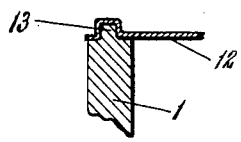
Fig. 11
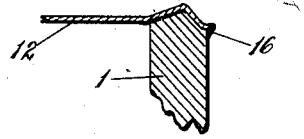
Fig. 12
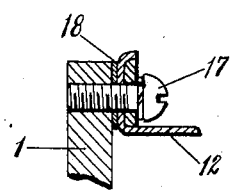
Fig. 13
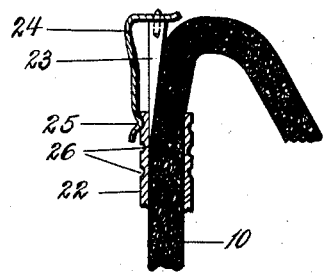
Fig. 19
Fig. 14
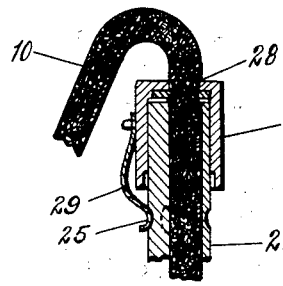
Fig. 15
Fig. 16
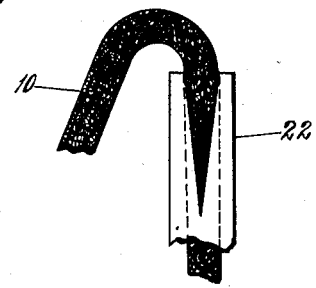
Fig. 17
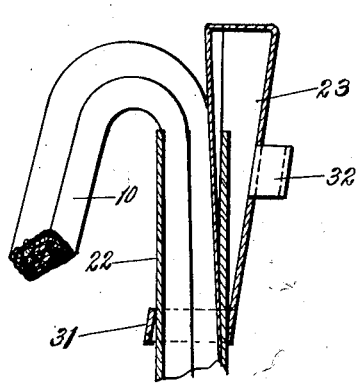
Fig. 18
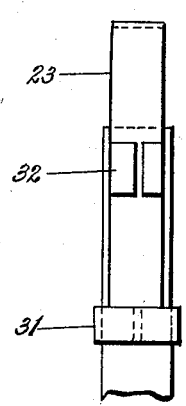
INVENTOR
CORNELIUS T. MYERS
BY
A. D. T. Libby
ATTORNEY Patented Mar. 8, 1927.

1,620,277

UNITED STATES PATENT OFFICE.

CORNELIUS T. MYERS, OF AVENEL, NEW JERSEY.

MAGAZINE LUBRICATING MEANS.

Application filed August 8, 1923. Serial No. 656,386.

This invention relates to means for oiling or lubricating bearings of various kinds especially those on automotive vehicles, particularly spring shackle bolts and other bearings, all of which have been found in the past to be hard to lubricate with grease which has in the majority of cases been used heretofore. All such exposed bearings as spring shackle bolts on automotive vehicles are subject to the attacks of dust, dirt, gravel, water, etc. which work their way into these bearings, which are more or less exposed, causing the grease to harden and thereby prevent lubrication or in many cases the grit and dirt gets into the bearings and they are quickly worn out, as well as being continuously noisy.

It is the principal object of my invention to provide lubricating means which will eliminate the troubles heretofore recited and to provide a chamber or reservoir for the lubricating oil of a size which will contain a large supply of the lubricant, thereby eliminating constant attention including filling the reservoir, which need only be filled over comparatively long intervals of time.

Another object of my invention is to provide lubricating means in which greater economy of the lubricant is obtained than in the past, by feeding to the bearings only just sufficient lubricant to keep them in nice, smooth, operating condition without any waste of lubricant. Incidently it may be mentioned that the oil which is drained from the crank case of the engine of the vehicle may be utilized in the reservoir for lubricating the spring shackle bolts, etc. When engine crank case oil is used, it can be used regardless of any dirt or moisture included in it. From this it will be readily seen that a big saving can be made by a concern operating a large fleet of automotive vehicles, such as trucks, at the same time obtaining most excellent lubrication of the bearings to which my invention is applied.

A further object of my invention is to provide means for regulating or controlling to any degree of nicety the flow of lubricant to the bearings, whereby the lubricant is not wasted, but is fed to the bearings in just the right quantity.

In my Patents 1,314,689 issued September 2, 1919, and 1,387,295 issued August 9, 1921, I have shown and described some of the fundamentals of my lubricating means and my present application is, therefore, directed to improvements in connection with certain details required to more economically carry out the broad invention disclosed in the above mentioned patents.

My present invention will be more clearly understood by reference to the attached drawings, in which:

Figure 7 is a view similar to Fig. 3 showing the reservoir attached to the top of the spring horn and showing a fragment of the spring.

Figure 8 is a section of Figure 7.

Figure 9 is a modified view showing the bearing pins integral with one of the shackle members and with the reservoir attached thereto, thereby forming a unitary structure.

Figure 10 is a modified form showing one way of attaching the cover element of the reservoir.

Figure 11 shows a still further means of attaching the cover to a shackle member.

Figure 12 is a still further modified view showing the means of attaching the casing or cover to a shackle member.

Figure 13 shows one form of controlling the flow of lubricant through the wick in the bearing.

Figure 14 illustrates another form of lubricant control,

Figure 15 being a side view of Fig. 14.

Figure 16 shows another form of regulating the flow of lubricant to the wick.

Figure 17 is a still further means of controlling this flow, and

Figure 18 is a side view of Fig. 17.

Figure 19 shows an enlarged section through the preferred form of wick, the port in which the wick is to operate being illustrated by a dotted line.

It will be understood that the various figures are not drawn to scale, but are made merely to illustrate the manner in which my invention may be carried out.

Figure 1:
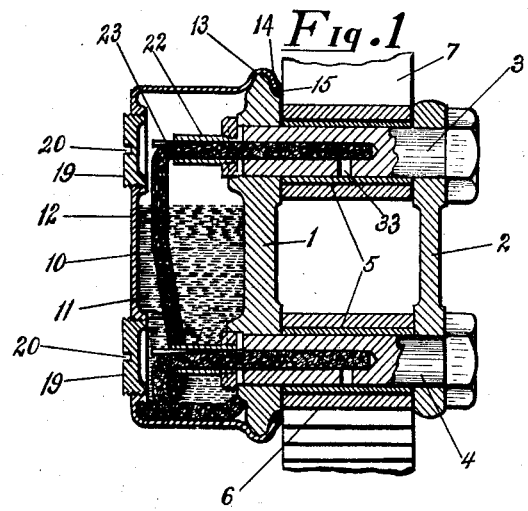
Figure 1 is a section on the line 1/1 of Fig. 2, showing the reservoir and lubricating means applied to spring shackle bolts.

Referring now to the details wherein like numbers refer to corresponding parts in the various views, 1 and 2 illustrate a pair of shackles in which the pins 3 and 4 are supported or have their bearings. Each of the pins 3 and 4 preferably have a bearing bushing 5 of any suitable material, such as bronze, and around the bushing 5 of pin 4 is carried a leaf of the spring 6, while the upper bushing 5 carries the usual frame bracket 7. Each of the pins 3 and 4 is provided with a substantially circular port illustrated by dotted line 9 in Fig. 19. These ports are adapted to receive a wick 10, which is positioned in the lubricant 11 carried by a relatively large chamber or reservoir formed by one of the spring shackles such as 1 and a member 12 that constructionally is made separate from the shackle member, but which may be fastened thereto in any satisfactory manner such as illustrated in Figs. 1, 10, 11 and 12. In Fig. 1, the shackle 1 has a flange 13 over which the lip 14 is formed, a gasket 15 preferably of soft metal, such as soft copper or lead, being used on the outer edge, or the lip may be brazed or welded to the shackle 1. In Fig. 10 the flange 13 is made rectangular in shape and the member 12 formed to fit, after which the casing 12 may be brazed or welded thereto. Figure 11 is shaped somewhat as illustrated, the weld being indicated at 16. In Fig. 12 the casing 12 is turned over and fastened to the shackle member 1 by screws 17, a gasket 18 being used to seal the joint. From these figures it will be understood that the means of attaching the member 12 may vary over wide limits, the principal idea being that the member 12 is constructionally made of material separate from the other portion of the reservoir and formed to fit said member. The cover member 12 is provided with two orifices which are normally closed by the plugs 19 which are provided with means such as screw driver slots 20 illustrated in Fig. 1 or a rib 21 shown in Fig. 4 for the purpose of readily removing the plugs in order to get at the means for controlling the flow of lubricant along the wick, which control means will now be described. Furthermore these orifices are used in assembling or withdrawing the pins 3 and 4.

As shown in certain of the figures, the ends of the pins having the wick ports carry a tube 22 which may be turned integral with the pins 1 or 2, or screwed therein as illustrated in several of the figures. At the point where the wick 10 enters the tube 22, a wedging member 23 is inserted between the wick and the inner wall of the tube, thereby compressing the wick and reducing its area at this point, which has the effect of reducing the flow of lubricant along the wick to the bearings. I have found in practice that the wedging member 23 may be made of a piece of wood, but this control means may take a number of forms, one such being illustrated in Fig. 13, wherein the wedging member 23 is fastened to a resilient member 24 which has a knob 25 formed on its outer end. The knob 25 is adapted to engage grooves 26 made in the tube 22 whereby as the wedge is moved either in or out the cooperation of the knob 25 in the grooves 26 will retain the wedge in its adjusted position. While the parts 23 and 24 in Fig. 13 are shown made in two pieces it will be readily understood that this may be of one piece.

Another controlling means is shown in Figs. 14 and 15 in which a collar 27 is carried on the outer end of the tube 22 which, however, is provided with a hole eccentric to its center line. As the collar 27 is turned around the tube 22, pressure is applied to the wick as indicated at the point 28. The collar 27 is retained in position by the spring member 29 which is formed with a knob 25 the same as in Fig. 13, which engages depressions 30 in the tube 22.

In Fig. 16 the end of the tube 22 is slit for a distance, and the slit end may be pinched to give the required density or compression on the wick 10 to control the speed of the lubricant.

In Fig. 17 the wedged member 23 is shown in the form of a punching, the inner end of which is provided with a collar 31 that normally is made so as to set in a skewed position on the tube 22, whereby the tube 22 is gripped by the collar 31, thus holding the wedge 23 in position. Ears 32 are formed on the wedge for the purpose of actuating the wedge through the orifice in the casing 12.

Figure 2:
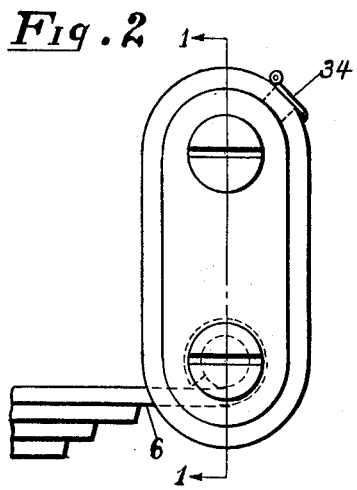
Figure 2 is a side view looking at the end of the reservoir, and showing a fragment of the spring attached to one of the shackle bolts.

By the means thus described for controlling the flow of lubricant through the wick, I am enabled to get just the amount of lubrication desired at the bearing surfaces, it being understood that the wedging member 23 being readily adjustable allows the use of oils having a considerable range of viscosity. It will further be understood that as the oil passes along the wick, the requisite number of suitable port openings, such as 33, are provided leading from the wick ports to the bearings themselves. While the plugs 20 are used for adjusting the wedging member 23, one of these may be also used for filling the reservoir, or an additional means such as an oil cap 34 shown in Fig. 2, may be provided. An additional plug may also be provided in the bottom of the reservoir for draining it.

Figure 4:
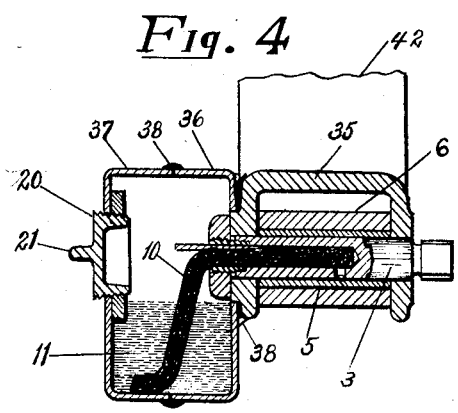
Figure 4 is a section through Fig. 3.

In Fig. 4 the spring horn 35 carries the casing member 12 which is shown made in two parts 36 and 37 braced or welded together as indicated at 38. Preferably the two parts 36 and 37 are identical so that but one set of tools need be required in their manufacture.

Figure 5:
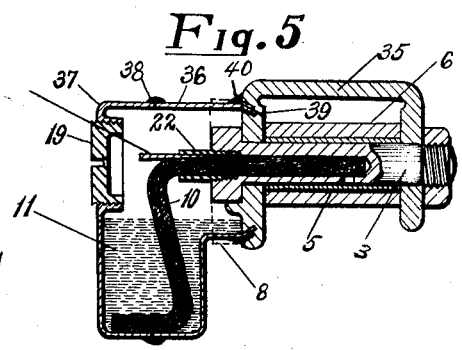
Figure 5 is a view somewhat similar to Fig. 4 but with different means of attaching the reservoir to the spring horn.

In Fig. 5 the side of the spring horn is conically slotted to receive a lip 39 of the member 36. Normally the lip 39 is straight and before assembly a sleeve 8, shown in dotted position, is slipped over the lip and then the lip pushed into the conical slot, the sleeve 8 is then driven into the slot which crimps the member 39 making a tight joint, or the slot can be straight and the member 39 may be welded to the member 35 as indicated at 40.

Figure 6:
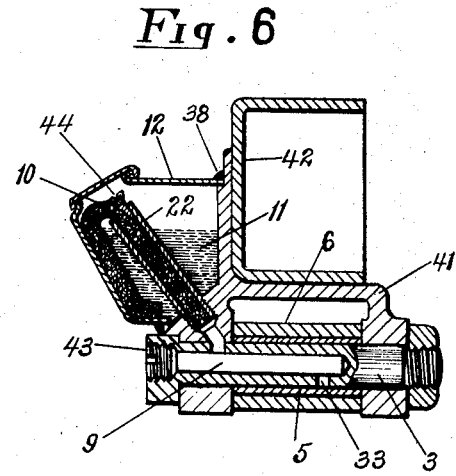
Figure 6 is a section of a bearing supported by a bracket attached to the side of the frame member.

In Fig. 6 a bracket 41 carries the pin 3 and bushing 5 in a manner similar to that shown in Figs. 1, 4 and 5. The bracket 41 is fastened in any suitable manner to a side member 42. The other part of the reservoir is formed by the casing 12 which is preferably welded as at 38 to the bracket 41. The outer end of the port 9 is closed by plug 43. In this figure the tube 22 shows a further modified form of lubricating control in the shape of a plain wood screw 44, which may be utilized to good advantage to compress the wick at the point where it enters the tube.

Figure 3:
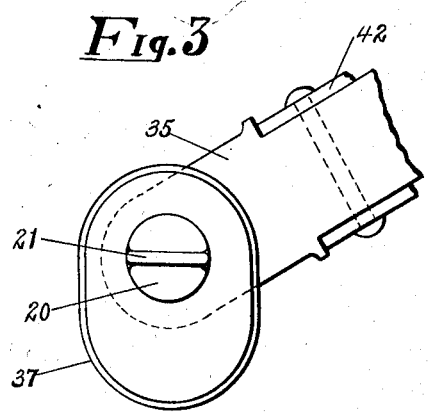
Figure 3 is a side view of the spring horn or front of the frame of an automobile, showing one form of reservoir attached thereto.

In Figs. 7 and 8 the casing 12 is fastened to the spring horn member in a vertical manner, or on top rather than on the side as illustrated in Figs. 3, 4 and 5, as by means of slots therein and the weld 38.

In Fig. 9 the pins 3 and 4 are shown integral with the shackle member 1; otherwise the arrangement is similar to that shown in Fig. 1. It will be understood that the shackle 1 may carry one of the pins integral with it and the other shackle 2 carry the other pin integral with it, but the construction shown in Fig. 9 illustrates how the lubricating means may be made up as an integral unit ready to be applied to a vehicle.

As has been stated, the wick used in my lubricating means is substantially square in cross section and of an area approximately equal to the area of the port hole 9 in the pins. I have found the use of square wicks to be highly advantageous for the following reasons:

First: When the wick is pushed into the tube or port hole the corners of the wick press lightly against the wall of the hole and helps to maintain the wick in position, which is accomplished without materially compressing and increasing the density of the wick.

Second: Square wicks can be cut from thin sheet felt, instead of being punched, as round ones are, from a sheet, the thickness of which would have to be equal to the length of the wick desired. It is, therefore, readily, perceived that square wicks made in the manner indicated are much cheaper and more uniform especially where these wicks are several inches in length. Where round wicks are punched from sheet felt the original density cannot be maintained and it is sometimes too dense for the proper rate of feeding.

Third: Square wicks are easy to insert in the tube or the port holes.

In this specification and the claims, where a wick is referred to, it means a device for feeding lubricant by capillary attraction.

While I have found that the various wedging devices are preferably carried on a tube as has been described, it will be understood that they may be carried by some part of the side walls of the reservoir and not on the pins or tubes themselves.

The construction herein described is especially adapted to be used in changing over the existing vehicles now in the field wherein one of the two spring shackles, for example the #2 in Fig. 1, may still be used, and since the pins 3 and 4 are usually tapped for the ordinary grease cup the same pins may be utilized if they are not already too much worn. As a matter of fact, I have found that in many cases, the bearing bushings 5 are not even required and the pins themselves may be of cold rolled steel, because of the fact that my lubricating means give continuous and effective lubrication at these bearing surfaces.

It will be clearly apparent to one skilled in the use and construction of moving vehicles that numerous changes may be made in the details of my invention, many of which have been shown and described herein, and I, therefore, do not wish to be limited to the exact construction shown, except as limited by the scope of the appended claims.

Having thus described my invention, what I claim is:

1. In a magazine lubricating means for automotive vehicles, a shackle member adapted to aid in the support of a bearing having a surface to be lubricated, said shackle member serving as one part of a lubricant supply reservoir, a second member constructionally separate from the shackle member but adapted to be fastened thereto in a manner to form the remaining part of said reservoir and means for feeding the lubricant from the reservoir to the bearing surface.

2. In a magazine lubricating means for automotive vehicles, a shackle member adapted to aid in the support of a bearing having a surface to be lubricated, said shackle member serving as one part of a lubricant supply reservoir, a second member punched, formed and fitted to the shackle member to form the remaining part of said reservoir and means for feeding the lubricant from the reservoir to the bearing surface.

3. In a magazine lubricating means for automotive vehicles, a rigid shackle member forming a part of a lubricant supply reservoir, a pin having a support in said shackle member, said pin having a port leading to a bearing surface on the pin, a second member constructionally separate from the shackle member but adapted to be fastened thereto in a manner to form the remaining part of said reservoir, a wick in the reservoir extending into said port for the purpose described, and means carried by the pin for controlling the rate of passage of the lubricant along the wick to said bearing surface.

4. In a magazine lubricating means for automotive vehicles, a rigid shackle member forming a part of a lubricant supply reservoir, a pin having a support in said shackle member, said pin having a port leading to a bearing surface on the pin and having one end projecting into said reservoir, a second member constructionally separate from the shackle member but adapted to be fastened thereto in a manner to form the remaining part of said reservoir, a wick in the reservoir extending into said port for the purpose described, a tube fastened to the end of the pin which extends into said reservoir and a wedging member cooperating with the tube for contracting the wick at the point where it enters the tube as and for the purpose described.

5. In a magazine lubricating means for automotive vehicles, a rigid shackle member forming a part of a lubricant supply reservoir, a pin having a support in said shackle member, said pin having a port leading to a bearing surface on the pin and having one end projecting into said reservoir, a second member constructionally separate from the shackle member but adapted to be fastened thereto in a manner to form the remaining part of said reservoir, a wick in the reservoir extending into said port for the purpose described, a tube fastened to the end of the pin which extends into said reservoir, a wedging means cooperating with the tube for contracting the wick at the point where it enters the tube as and for the purpose described, and means associated with the tube for holding the wedging means in a given set position.

6. In a magazine lubricating means for automotive vehicles, a rigid shackle member having a peripheral flange and forming a part of a lubricant supply reservoir, a pin having a support in said shackle member, said pin having a port leading to a bearing surface on the pin, a casing member with a clamping rim to fit over said flange thereby completing said reservoir, a wick in said reservoir extending into said port, an opening in said casing opposite the end of said pin with means for closing the opening.

7. In a magazine lubricating means for automotive vehicles, a rigid shackle member forming a part of a lubricant supply reservoir, a pin having a support in said shackle member, said pin having a port leading to a bearing surface on the pin, a second member constructionally separate from the shackle member but adapted to be fastened thereto in a manner to form the remaining part of said reservoir and a wick in the reservoir extending into said port.

8. In a magazine lubricating means for automotive vehicles, a rigid shackle member forming a part of a lubricant supply reservoir, a pin having a support in said shackle member, said pin having a circular port leading to a bearing surface on the pin, a second member constructionally separate from the shackle member, but adapted to be fastened thereto in a manner to form the remaining part of said reservoir, and a wick substantially square in cross-section located in the reservoir and extending into said port for the purpose described.

9. In a magazine lubricating means especially adapted for spring shackles, a pair of rigid members, one of which forms a part of a lubricant supply reservoir, a pair of pins at least one of which is integral with one of said rigid members, ports in said pins leading to bearing surfaces thereon, a second member constructionally separate from said rigid members but adapted to be fastened to one end thereof in a manner to form the remaining part of said reservoir and wicks in the reservoir extending, one into a port in each of said pins for the purpose described.

10. In a magazine lubricating means for automotive vehicles, a spring bolt having a surface to be lubricated with ports leading to said surface, a spring bolt member adapted to aid in the support of said bolt, a member constructionally separate from said support member, but adapted to be fastened to said support member, independently of the bolt and in a manner to form, with the support member a fluid lubricant supply reservoir and regulating means including a wick within the reservoir and extending to said ports for feeding the fluid lubricant from the reservoir to the surface to be lubricated.

In testimony whereof, I affix my signature.

CORNELIUS T. MYERS.